(12) United States Patent
Bewlay et al.

(10) Patent No.: US 6,626,228 B1
(45) Date of Patent: Sep. 30, 2003

(54) TURBINE COMPONENT REPAIR SYSTEM AND METHOD OF USING THEREOF

(75) Inventors: Bernard Patrick Bewlay, Schenectady, NY (US); Peter George Frischmann, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 259 days.

(21) Appl. No.: 09/670,590

(22) Filed: Sep. 29, 2000

Related U.S. Application Data

(62) Division of application No. 09/138,729, filed on Aug. 24, 1998, now abandoned.

(51) Int. Cl.[7] .............................................. B22D 11/00
(52) U.S. Cl. ..................... 164/463; 164/478; 164/80; 164/122.1
(58) Field of Search ................. 164/463, 423, 164/429, 478, 80, 122.1

(56) References Cited

U.S. PATENT DOCUMENTS

| | | | | |
|---|---|---|---|---|
| 5,601,139 A | * | 2/1997 | Remy .......................... | 164/463 |
| 5,642,771 A | * | 7/1997 | Forest ......................... | 164/463 |
| 5,913,555 A | * | 6/1999 | Richter et al. ............. | 29/889.1 |

FOREIGN PATENT DOCUMENTS

| | | | | |
|---|---|---|---|---|
| JP | 58-55154 | * | 4/1983 | ................. 164/463 |
| JP | 60-199551 | * | 10/1985 | ................. 164/463 |

* cited by examiner

*Primary Examiner*—Tom Dunn
*Assistant Examiner*—I.-H. Lin
(74) *Attorney, Agent, or Firm*—Robert P. Santandrea; Patrick K. Patnode

(57) ABSTRACT

A system and method for repairing turbine components. The system includes means for obtaining a rapidly solidified material having a means of forming a rapidly solidified repair material and a means for melting the rapidly solidified repair material at a repair site located in a region of the turbine component. The means for obtaining the rapidly solidified material include melt spinning, planar flow, and melt extraction systems. Means for melting the rapidly solidified repair material include a welding torch, an electron beam, a laser beam, a welding torch, a TIG welder, and a plasma torch. A method for using the repair system includes the steps of providing a molten repair material, contacting the molten repair material with a rotating drum, thereby rapidly solidifying the repair material, melting the rapidly solidified repair material and portion of the turbine component at a repair site, and resolidifying the molten repair material and turbine component portion, thereby repairing a defect located at the repair site.

60 Claims, 3 Drawing Sheets

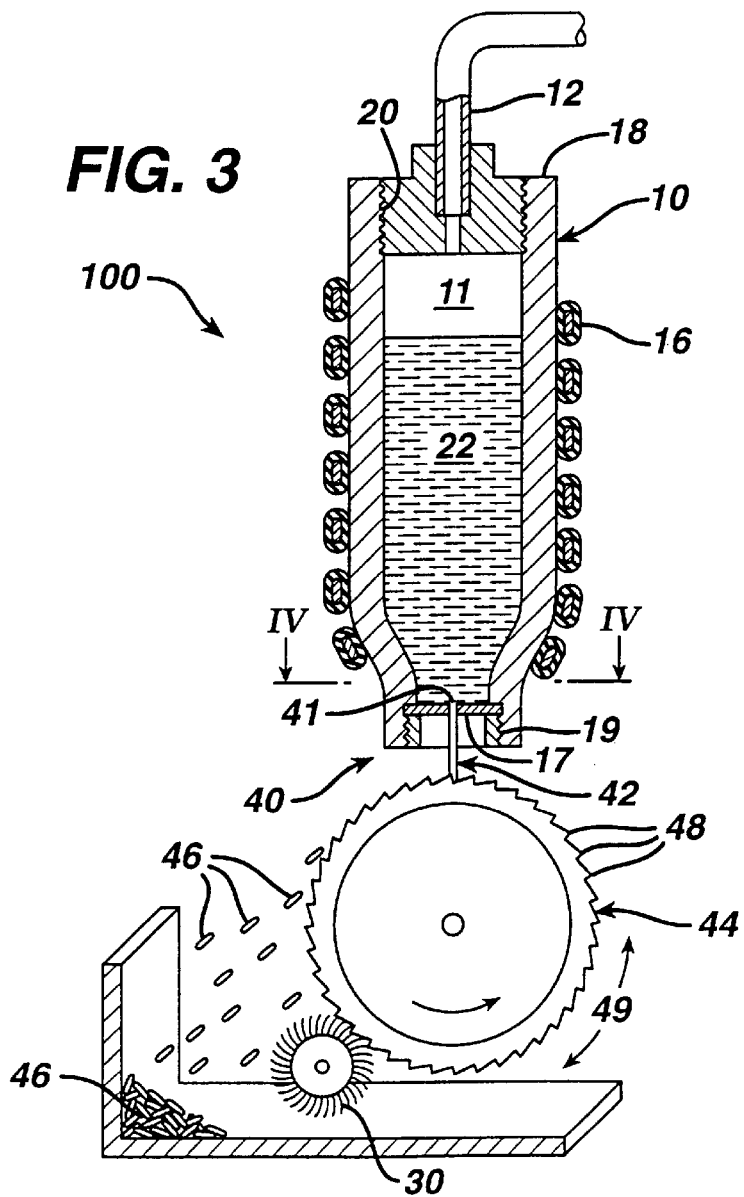
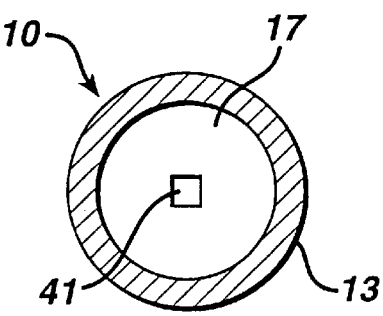
FIG. 3
FIG. 4

TURBINE COMPONENT REPAIR SYSTEM AND METHOD OF USING THEREOF

CROSS REFERENCE TO RELATED APPLICATIONS

This application is a Divisional of application Ser. No. 09/138,729, filed on Aug. 24, 1998 and now abandoned.

FIELD OF THE INVENTION

The present invention relates to the repair of turbine components. In particular, the present invention relates to a system for repairing turbine components. More particularly, the present invention relates to a method of using a system for repairing turbine components.

BACKGROUND OF THE INVENTION

Turbines components, such as blades, nozzles, vanes, airfoils, tips and the like (hereinafter "turbine components") are frequently formed from superalloys, for example, nickel-based superalloys, that have a directionally solidified single-crystal structure. The turbine components can be manufactured with defects, including cracks, surface defects, imperfections and holes. These defects must be repaired for reliable, proper, and dependable performance of the turbines. Turbine components also develop defects during service throughout their lifetime. These service-related defects may occur by wear, oxidation, and erosion. Such defects include cracks, surface defects, imperfections, and holes. These turbine component defects must be repaired for proper, dependable, and reliable operation of the turbine.

A previous defect repair method provided a repair material that filled the defect. The repair material was preferably the same material as a turbine component. The repair material was melted, and re-solidified to the turbine component at the defect site. The process was intended to provide an integral repaired structure, with a turbine defect site proximate the defect melting and re-solidifying with the repair material. Thus, repair material and the turbine component material formed a solid, one-piece repaired member.

Nickel-based superalloy repair materials are often used in a repair process for turbine components. The nickel base superalloy turbine component material will re-solidify with the nickel-based superalloy repair material to provide the turbine component with a structure similar to, and compatible with, its original metallurgical microstructure.

Repair material can take many different forms dependent on the defect. A wire repair material is often used for turbine blade tip repairs because turbine blade defects are commonly cracks and a melt feed from wire can be shaped to conform with a turbine blade tip shape. The wire repair material, also referred to as a weld wire, may be formed from a nickel-based superalloy composition for repairing a turbine component formed from a nickel-based superalloy. A nickel-based superalloy composition weld wire can be manufactured by powder metallurgy processes in conjunction with mechanically working to a wire form.

Powder metallurgy processes for producing nickel-based superalloy compositions often produce high volume fractions of strengthening precipitates, such as gamma prime ($\gamma'$) material. The $\gamma'$ material, which is produced in amounts up to about 70% by volume, makes weld wire brittle with low workability, and difficult to form into small diameter wires, and difficult to handle. The $\gamma'$ containing material is not ductile (will not exhibit plastic deformation) and will not bend. A brittle repair material is not well suited for further thermo-mechanical processing. A powder metallurgy-produced material also contains undesirable inclusions and contaminant intrinsic to powder metallurgy processes. Further, powder metallurgy produced wires are difficult to manufacture because conversion of raw material to wire uses conventional thermo-mechanical processes, which are expensive, time consuming, and generally not practical for materials with high $\gamma'$ volume fractions, for example up to about 70%.

Known powder metallurgy processes involve numerous steps and operations, including powder generation, consolidation, thermo-mechanical processing, and final grinding. The numerous steps present many opportunities for process error, such as foreign matter added during the process to contaminate the repair material. Foreign matter often leads to inclusions and contamination of the powder, which is undesirable. If a site is repaired using contaminated material, a resultant repaired site may not be acceptable, because it is not metallurgically sound. The repaired site will not be homogeneous due to the inclusions and contaminants, and an inherently weak spot may result where failure of the turbine component may occur, which, of course, is undesirable. The non-bending of brittle wire repair material also makes the wire material undesirable for a wire feed in tungsten inert gas (TIG) weld repair, where a wire is fed at a nozzle of a weld gun to melt the repair material.

A brittle repair material, such as a wire, is difficult to bend and conform to a crack-like defect without breakage. Breakage of the wire leads to discontinuities in the repair material at the repair site prior to melting. If the repair site is not full of repair material, prior to melting, due to discontinuities, the defect will not be completely filled and incomplete repaired sites may result. These incomplete repaired sites lead to voids in the repaired turbine component structure, which are undesirable.

Therefore, it is desirable to provide a powder metallurgically-produced repair material and a single-step process for forming repair material. The repair material should provide a low volume fraction of $\gamma'$ precipitates, thus making it less brittle and more ductile; and contain fewer contaminants and inclusions than materials formed by conventional powder metallurgy processes. The single-step process should produce a repair material that is amenable to further thermo-mechanical processing, such as, but not limited to swaging, wire drawing, and finishing operations. A turbine component, which is repaired with this material will be metallurgically sound due to the lack inclusions and contaminants in the repair material.

SUMMARY OF THE INVENTION

The present invention provides a system for providing a repair material and repairing a turbine component. The present invention also provides methods of using the system to repair turbine components as well.

Accordingly, one aspect of the present invention is to provide a turbine component repair system. The turbine control system comprises: a means for forming a rapidly solidified turbine repair material; and a means for melting the rapidly solidified repair material at the repair site, wherein the repair material bonds to the turbine component upon resolidification, thus repairing the turbine component.

A second aspect of the present invention is to provide a method of repairing a turbine component comprising the steps of: providing a rapidly solidified turbine repair material; disposing the rapidly solidified turbine repair material on a region of the turbine component that includes a defect to be repaired; melting the rapidly solidified repair material and a portion of the turbine component proximate to the defect; and resolidifying the rapidly solidified repair material and the portion of the turbine component, wherein the rapidly solidified repair material bonds to the portion of the turbine component, thereby removing the defect and repairing the component.

A third aspect of the invention is to provide a method for providing a rapidly solidified turbine repair material comprising the steps of molten providing a repair material and contacting the molten repair material with a peripheral surface of a rotating drum, wherein the molten repair material is cooled, thereby forming the rapidly solidified turbine repair material.

Finally, a fourth aspect of the present invention is to provide a method of repairing a turbine component comprising the steps of: providing a molten repair material; contacting the molten repair material with a peripheral surface of a rotating drum, wherein the molten repair material is cooled, thereby forming the rapidly solidified turbine repair material; obtaining the rapidly solidified repair material; disposing the rapidly solidified repair material on a region of the turbine component, wherein the region includes a defect to be repaired; melting the rapidly solidified repair material and a portion of the turbine component proximate to the defect; and resolidifying the rapidly solidified repair material and the portion of the turbine component, wherein the rapidly solidified repair material bonds to the portion of the turbine component, thereby removing the defect and repairing the turbine component.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIG. 3 is a part-schematic part-sectional representation of another RS powder producing system;

FIG. 4 is a view along line IV—IV in FIG. 2; and

DETAILED DESCRIPTION OF THE INVENTION

Figure 1:
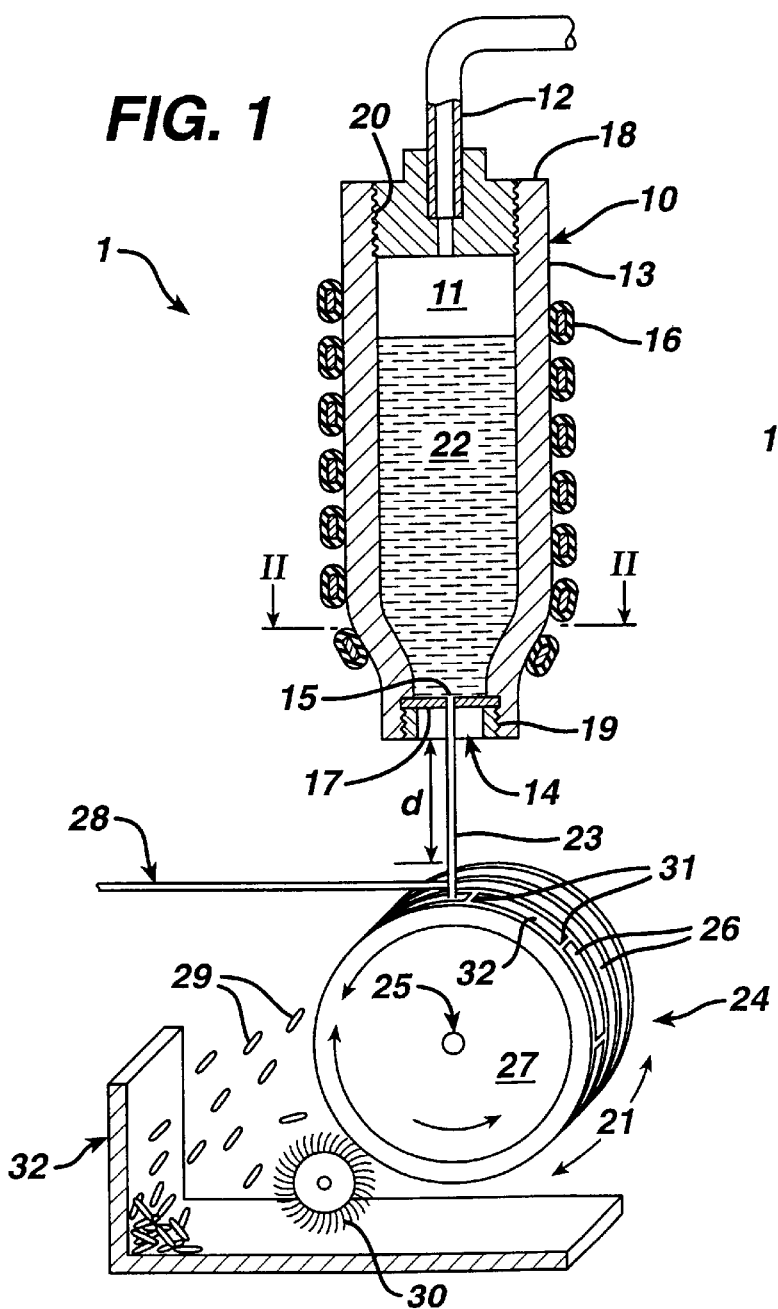
FIG. 1 is a part-schematic part-sectional representation of a RS powder producing system.

The present invention provides processes for manufacturing repair material, such as weld wire. The invention describes the process with respect to a weld wire repair material, however this is merely exemplary of repair material types within the scope of the invention. Other forms, shapes and configurations of repair material are within the scope of the invention.

Processes to form a repair material, such as one of a sheet, fiber, and powder, comprise substantially one-step processes that produce a rapidly solidified (RS) material. By rapidly solidifying a material, the material is solidified at a very rapid rate, for example at rates higher than about $10^{4°}$ C./sec, however quench rates are not solely determinative of rapidly solidified materials. A RS material may be discerned from its microstructure. A RS material generally possesses relatively few, if any, inclusions and contaminants, which is desirable in a repair material, and has a very fine grain structure or is amorphous. RS material contains few inclusions and contaminants, such as foreign matter that contaminates a process, because a number of processing steps is minimal and the solidification rate is rapid. The reduced process steps and rapid solidification rate minimize chances of contaminants entering the process and resultant material.

RS material is produced by a rapid solidification that suppresses formation of γ' precipitates for example in a volume percent in a range between about 20% and about 30% and reduces γ' precipitates sizes compared to materials produced by prior processes that have a lower solidification rate. An inclusion density (volume fraction) of γ' for RS material is less than about 10%. The rapid solidification rates occur at quench rates greater than or equal to $10^{4°}$ C./s. The resultant RS repair material comprises a fine scale microstructure, where the repair material composition will be ductile, essentially contaminant-free, and desirable for turbine component repair. Any precipitate forming elements in the material, such as, but not limited to, titanium (Ti) and aluminum (Al), remain in solid solution during rapid solidification processes.

The repair material manufacturing processes within the scope of the invention comprise, but are not limited to, melt-spinning, melt extraction and planar flow casting. Planar flow casting is a derivative of a melt-spinning process. These processes provide a fast, less expensive, and less intensive step-wise manufacture of material, such as nickel-based superalloy powders, when compared to conventional powder metallurgy processes. These manufacturing processes provide a ductile repair material that is essentially homogeneous with relatively few inclusions and contaminants.

A homogeneous repair material, when used to repair a turbine component formed of a similar material, results in a substantially homogeneous repaired site that includes few, if any, inclusions and contaminants. If the turbine component is formed from a directionally solidified single-crystal microstructure, a micro-crystalline repair material composition is a desirable. The repair material will re-solidify with the melted turbine component material to form a compatible grain structure with the initial turbine component material. Alternatively, the repair material is instantly formed with a compatible microstructure as the turbine component.

To repair a turbine component crack defect, a weld wire is disposed in the defect, for example, by deforming the weld wire to conform with the defect. The weld wire repair material and a surrounding turbine component site (defect site) are melted by an appropriate source of energy, such as an electron beam. The melted repair material and turbine component defect site re-solidify together. The re-solidified repaired turbine component site possesses a microstructure, for example a directionally solidified single-crystal microstructure, that is the same as a remainder of the turbine component. Thus, the repaired site is integral with similar microstructure metallurgically sound and unlikely to fail at the repaired site.

Systems and processes to produce RS materials, as embodied by the invention, will now be discussed with respect to forming a nickel-based, superalloy RS material weld wire. The processes can be used to produce other repair materials, and a nickel-based, superalloy RS powder and weld wire is merely exemplary of the invention.

Melt-spinning (also known as free-jet melt-spinning) rapidly solidifies molten metal to form RS material, where the RS material (often referred to as "fiber") size is dependent on an intended use. For example, a RS material produced by melt-spinning is produced in lengths having a range from a few microns to a continuous length. A thickness and width of a RS repair material produced by melt-spinning are in a range between about 50 µm to about 100 µm.

FIG. 1 is a schematic representation of a melt spinning (MS) system 1. A melting chamber (also known as a crucible) 10 comprises an interior portion 11, an inlet 12 and an outlet 14. A heater device 16 is provided in thermal communication with the chamber 10. The heater device 16 comprises any appropriate heating device construction. Although FIG. 1 illustrates the heater structure 16 disposed on an exterior 13 of the chamber 10 as a separate element, the heater structure 16 may be formed integrally with the chamber 10. Alternatively, the heater device 16 is disposed in the interior portion 11 of the chamber 10 (not illustrated).

The inlet 12 of the chamber 10 permits inert gas to enter the chamber 10. The inert gas provides pressure to extrude molten repair material 22 from the chamber 10. The inlet 12 communicates with a top wall 18 of the chamber 10, where the top wall 18 comprises a separate element from the chamber 10. Alternatively, the top wall 18 may be formed integrally with the chamber 10. The top wall 18 is attached to the chamber by any manner, for example integral therewith, to insure a chamber 10 that maintains pressure within the interior portion 11. As illustrated in FIG. 1, the top wall 18, in one exemplary embodiment of the invention, is attached the chamber 10 with screw threads 20.

Figure 2:
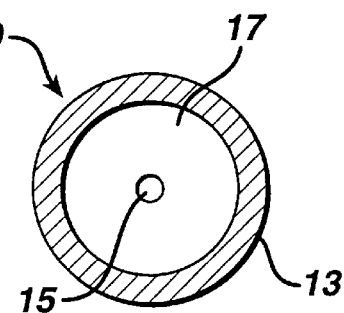
FIG. 2 is a view along line 11—11 in FIG. 1.

The outlet 14 of the chamber 10 comprises a nozzle plate 17 with a substantially circular outlet nozzle 15 with a diameter in a range between about 0.5 mm and about 2.0 mm, as illustrated in FIG. 2. The nozzle plate 17, although illustrated in FIG. 2 as substantially circular may comprise any shape corresponding to the shape of the chamber 10. The outlet 14 is disposed at a lower portion of the chamber 10, so molten repair material 22 is extruded out of the chamber 10 by the inert gas as a molten stream 23. Alternatively, the molten repair material 22 free-falls from the chamber 10 under the force of gravity.

The molten material stream 23 exits from the nozzle and strikes a rotating drum 24. The rotating drum 24 is positioned below the outlet 14 for example, separated by a distance "d" in a range between about 1.0 and about 5.0 mm. The drum 24 comprises at least one groove 26 on its periphery 21 (the distance around a circumference of the drum's cross-section). The groove 26 comprises a shape and size to produce RS material 28 in a desired shape, such as, but not limited to, elongated lengths greater than one (1) periphery, definite lengths less than one periphery, and varying thicknesses and widths. For example, if an elongated length of RS material is desired, the groove 26 is continuous around the periphery 21 of the wheel 24 with an appropriate width and depth. A continuous length of RS repair material 28 is formed by pulling off an undivided, elongated (with a length equal to or greater than one (1) periphery), continuous length of repair material from a continuous groove 26 and collecting it. Alternatively, if RS repair material 29 of a set length is desired, at least one protrusion 31 is located in the groove 26. The protrusions 31 divide the groove 26 into sub-grooves 32. Each sub-groove 32 defines a set length in the groove 26 between protrusions 31, and defines a length of the RS repair material 29 equal to the set length.

The stream 23 of molten repair material 22 contacts the drum 24. The molten material 22 cools in the grooves 26 by contact with the drum 24. The drum 24 may be supplied with a cooling medium (not illustrated) in its interior 27 to facilitate solidification of RS material 28 in the grooves 26.

The drum 24 rotates at a sufficient speed so most of the RS repair material 29 is thrown off the drum 24 by centrifugal forces imparted to the RS repair material 29. Any RS repair material 29 in the grooves 26 will be removed by an optional brush 30. The brush 30 rotates in a direction opposite to the drum 24 to remove the RS repair material 29 from the drum 24. For example, as illustrated, the drum 24 rotates in a first direction (counter-clockwise) and the brush 30 rotates in a second direction (clockwise) opposite the first direction. The opposite rotations ensure that any RS repair material 29 remaining will be removed.

The RS powder 28 is collected in a receptacle 32. The receptacle 32 takes any appropriate form, so long as it collects the RS repair material 29. If RS repair material 28 is formed of a continuous length, the RS material 28 is wound on an appropriate collector receptacle, such as but not limited to a spool (not illustrated).

A planar flow casting system 100 is illustrated in FIG. 3. Planar flow casting is a rapid solidification process that is related to melt spinning. In the planar flow casting system 100, the chamber is essentially similar to the chamber 10 used in a melt spinning system. Accordingly, a further discussion of the chamber's features is omitted.

The planar flow casting system 100 differs from a melt spinning system 1 in that the outlet from the chamber is modified. Alternatively, a planar flow casting system 100 differs from a melt spinning system 1 in that the rotating drum comprises altered structure to form the RS repair material. Further, as another alternative, a planar flow casting system 100 differs from a melt spinning system 1 in that the outlet from the chamber comprises a modified structure and the drum is altered. The following description of the planar flow casting system 100 discusses a modified outlet and an altered drum, however the scope of the invention includes either feature used independently.

In FIG. 3, the chamber 10 comprises an outlet 40. The outlet 40 is disposed proximate a rotating drum 44. The outlet 40 is closer, for example in a range between about $2.5 \times 10^{-5}$ m to about $10^{-4}$ to the rotating drum 44 than the positioning of the outlet 14 and the drum 24 in the melt spinning system 1 of FIG. 1. The distance from the outlet 40 to the drum 44 ensures that jetting of the repair material stream 42 does not occur in the planar flow casting system 100.

The outlet 40 comprises a rectangular nozzle 41 (FIG. 4). Thus, the repair material stream 42 is fed out of the outlet 40 as a substantially rectangular stream. For example, the nozzle has a cross-section with a thickness formed in a range between about 5 mm and about 20 mm, with a width formed in a range between about 0.5 m to about 1.0 mm.

The rotating drum 44 comprises notches 48 on its periphery. The notches 48 form the RS material when the stream 42 strikes the drum 44. The ultimate desired shape of the repair material is dependent on a size and shape of the notches 48. For example, the notches 48 may be elongated, such as extending about the entire periphery 49 of the wheel 44, with a single notch 48 defining a length of the RS repair material 46. Alternatively, a plurality of notches 48 is provided with variable or equidistant spacing between the notches 48 defining lengths of RS repair material 46. The illustrated notch configuration is merely exemplary and is not meant to limit the invention in any way.

The repair material stream 42 contacts the drum 44, and is received in the notches 48. As the molten repair material cools in the notches 48, RS repair material 46 is formed. The rotating drum 44 rotates at a speed sufficient to throw RS repair material 46 off the drum 44. A brush 30, as provided in the melt spinning system 1, may also be provided to remove RS repair material 46 remaining on the drum 44. Also, the drum 44 may be cooled as in the melt spinning system 1.

In both the melt spinning and planar flow casting systems, 1 and 100 respectively, a periphery configuration (surface structure of the drum) of the drum, such as the groove 26 and notches 48, form the RS material. The solidification rates of both systems are rapid enough to produce RS material comprising few, if any, inclusions and foreign matter, with fine micro-crystalline microstructure. For example, a volume fraction of inclusions is less than about 1% and the inclusion size is less than about 25 microns ($2.5 \times 10^{-5}$ m). The volume fraction of γ' is less than about 10% and the γ' size is less than about 1 micron ($10^{-6}$ m).

Figure 5:
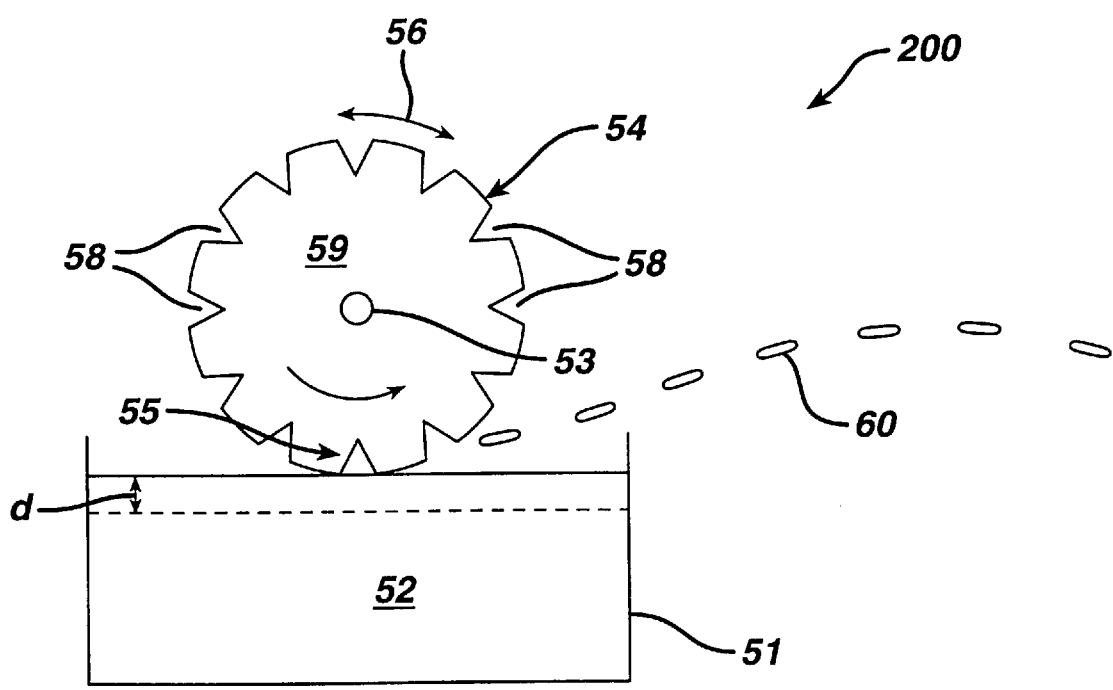
FIG. 5 is a schematic representation of a further RS powder producing system.

Melt extraction is another process within the scope of the invention to produce RS repair material. FIG. 5 is a schematic representation of a melt extraction system 200, as embodied by the invention. In FIG. 5, a chamber 51 holds molten metal 52. The chamber 51 is insulated to maintain the metal in a molten form. Alternatively, the chamber 51 comprises heater device (not illustrated) to maintain the metal in its molten condition.

A drum 54 is rotatably mounted on an axis 53 so that a portion 55 of the drum 54 is in contact with the molten metal 52. At least a periphery 56 of the drum 53 contacts the molten metal 52 surface. Alternatively, the portion 55 is in contact with the molten metal, where the periphery 56 of the drum 53 is below the molten metal 52 surface a distance "d". The contact between the drum 54 and molten metal 52 varies dependent on the nature of RS material desired, however some contact occurs between the drum 54 and the molten material 52.

The molten metal 52 and drum 54 are maintained in contact with one another, for example by feeding more material into the chamber 51, either as a molten material or as a solid material where it can melt in the chamber 51. Alternatively, the drum 54 adjusts to the level of the molten material 52 to maintain contact at portion 55. The drum 54 comprises a coolant-filled interior 59, such as a water-filled interior. Thus, molten metal 52 rapidly solidifies into RS material 60 on the drum 54. The drum 54 rotates about axis 55, so formed RS material 60 flies off the drum 54.

The periphery 56 of the drum 54 comprises notches 58. The notches 58 are sized and shaped to capture molten metal 52 as the drum 54 contacts the molten metal 52. The size and shape of the notches 58 control the size of the RS material 60. The notches 58 can be sized to produce RS material 60 with varying lengths, thicknesses, and widths. The notches 58 do not need to be all of the same size. Notches 58 of differing sizes can be provided on one drum 54, to produce RS materials of differing sizes, without requiring separate drums.

RS materials 28, 29, 46, and 60, which are formed by the above one-step rapid solidification processes, are usable in their as-produced form as RS repair material. The as-produced form is often wire. If a turbine component defect size is larger than the as-produced powder or a larger repair material is desired, two or more RS materials 28, 29, 46, and 60 are combinable to form an enlarged RS repair material. The RS materials 28, 29, 46, and 60 can be combined together by any appropriate method, either physically or metallurigally. For example, two or more RS materials 28, 29, 46, and 60 are physically connected, such as by one of braiding, weaving, and crimping together to form a repair material, which is larger than a single powder fiber. RS repair materials can be further connected to each other to form a large spool of weld wire. Alternatively, the RS material 28, 29, 46, 60 can be consolidated into a repair material by known metallurgy processes. These processes include, but are not limited to, hot-isostatic pressing (HIP), powder rolling, sintering, sintering and re-rolling, and roll briquetting. The final shape of the RS repair material depends on the ultimate use of the repair material and a defect type, size and shape.

Of the above described rapid solidification processes, fiber melt extraction provides varying dimensions of RS material depending on notch dimensions. Thus, the RS material produced by this process is desirable, since the repair material can be used without significant after-powder manufacturing processing steps.

Turbine components and turbine component tips are repaired using repair material produced as described herein. Typically turbine components comprise a nickel-based superalloy, for example a material selected from one of directionally solidified nickel-based superalloy and a nickel-based superalloy single-crystal. The nickel-based superalloy repair materials comprise the same material as the turbine component. Alternatively, the nickel-based superalloy repair material comprises a different material as the turbine component.

The RS repair material may also be used to repair a turbine blade tip. To repair a turbine blade tip, the RS repair material is positioned at the tip, for example by wrapping the RS repair material around the turbine tip thus covering the turbine tip. If the RS repair material is provided in set length of weld wire pieces, these weld wire pieces are individually positioned at the tip. Alternatively, the RS repair material may be provided as a continuous weld wire, where the continuous weld wire is disposed over the portions of the turbine blade tip. Once positioned at the tip, the weld wire is melted, by an appropriate energy source, and re-solidified with the turbine blade tip.

Alternatively, the wire repair material is used with a TIG weld repair process. This process is often used to replace ground away portions of a turbine component. The wire is melted and disposed on the turbine essentially in the same step.

While various embodiments are described herein, it will be appreciated from the specification that various combinations of elements, variations or improvements therein may be made by those skilled in the art, and are within the scope of the invention.

What is claimed is:

1. A method of repairing a turbine component, the method comprising:
   providing a material having a volume fraction of precipitates less than about 50% volume percent and with a size less than about $10^{-6}$ m, the material produced by a method comprising:
      providing a molten metal material; and
      cooling the molten metal material at a quench rate sufficient to reduce formation of precipitates and reduce inclusion density and form a rapidly solidified material;
   disposing the material at a portion of the turbine component to be repaired;
   melting the repair material; and
   resolidifying the repair material and any turbine component material that has melted.

2. A method according to claim 1, wherein the step of cooling comprises contacting a rotating drum with the molten metal material.

3. A method according to claim 2, wherein the drum comprises at least one groove, the at least one groove defining a length, width, and depth; and
the step of cooling comprises contacting the molten metal material in the at least one groove to form the rapidly solidified material the rapidly solidified material having a length, width, and thickness corresponding to the length, width, and depth of the at least one groove.

4. A method according to claim 3, wherein the at least one groove comprises a continuous groove around the drum; and
the step of cooling comprises contacting the molten metal material in the continuous groove to form an elongated length of the rapidly solidified material.

5. A method according to claim 3, wherein the groove comprises protrusions defining at least one sub-groove in the at least one groove; and
the step of cooling comprises contacting the molten metal material in one at least one sub-groove to form rapidly solidified material with a length corresponding to the at least one sub-groove.

6. A method according to claim 3, wherein the at least one sub-groove comprises a plurality of sub-grooves of different lengths.

7. A method according to claim 2, wherein the drum further comprises at least one notch disposed on the perimeter of the drum, the at least one notch possessing a length, width, and depth that corresponds to a length, width, and thickness of the rapidly solidified material.

8. A method according to claim 7, wherein the at least one notch comprises a plurality of notches.

9. A method according to claim 8, wherein at least one of the plurality of notches comprises a size different from the others of the plurality of notches.

10. A method according to claim 1, wherein the rapidly solidified material is ductile and capable of plastic deformation without breaking.

11. A method according to claim 1, further comprising the step of collecting the rapidly solidified material.

12. A method according to claim 1, further comprising connecting the rapidly solidified material together to form an enlarged rapidly solidified material.

13. A method according to claim 1 wherein the step of providing a molten metal material comprises:
providing a chamber, the chamber having an interior, inlet, and outlet;
providing metal material to the chamber, the metal material comprising one of a molten metal material and a solid metal material
heating the chamber to maintain molten metal material molten and melt solid metal material; and
feeding a gas through the inlet of the chamber to the interior of the chamber, the gas forcing the molten metal material from the outlet of the chamber in the form of a molten metal material stream.

14. A method according to claim 13, further comprising the step of contacting the stream onto a rotating drum.

15. A method according to claim 1, wherein the turbine component comprises at least one defect to be repaired, said disposing the repair material comprises disposing the repair material in the defect to be repaired.

16. A method according to claim 15, wherein the disposing the repair material comprises deforming the repair material to a shape that corresponds to a shape of the defect.

17. A method according to claim 1, wherein the turbine component comprises a turbine blade tip; and
said disposing the repair material comprises disposing the repair material over the turbine blade tip.

18. A method according to claim 1, wherein the step of disposing the material and melting occur substantially together.

19. A method of repairing a turbine component comprising the steps of:
a) providing a rapidly solidified repair material, said repair material containing a plurality of precipitates, wherein each of said plurality of precipitates has a size less than $10^{-6}$ m and said plurality of precipitates comprise a volume fraction of less than about 50 volume percent of said rapidly solidified repair material;
b) disposing said rapidly solidified repair material on a region of said turbine component, wherein said region includes a defect to be repaired;
c) melting said rapidly solidified repair material and a portion of said turbine component proximate to said defect; and
d) resolidifying said rapidly solidified repair material and said portion, wherein said rapidly solidified repair material bonds to said portion, thereby removing said defect and repairing said turbine component.

20. The method according to claim 19, wherein the step of providing a rapidly solidified repair material further includes the steps of:
a) providing a molten repair material; and
b) quenching said repair material at a predetermined quench rate, thereby forming said rapidly solidified repair material.

21. The method according to claim 20, wherein the step of providing a molten repair material further includes the steps of:
a) providing a crucible, said crucible having a heating means, at least one side wall, and a floor, said side wall and said floor defining an chamber therein;
b) providing a repair material to said chamber, said repair material having a melting temperature; and
c) heating said chamber and said repair material contained therein to a predetermined temperature, said predetermined temperature being greater than the melting temperature of said repair material, thereby forming said molten repair material.

22. The method according to claim 20, wherein the step of providing a molten repair material further includes the steps of:
a) providing a crucible, said crucible having a top wall, at least one side wall, and a floor having an outlet disposed therein, said top wall, said side wall and said floor defining an chamber therein, a heating means, and an inlet disposed on one of said top wall and said side wall;
b) providing a repair material to said chamber, said repair material having melting temperature;
c) feeding a gas through said inlet;
d) heating said chamber and said repair material contained therein to a predetermined temperature, said predetermined temperature being greater than the melting temperature of said repair material, thereby forming said molten repair material; and
e) passing said molten repair material through said outlet.

23. The method according to claim 22, wherein the step of passing said molten repair material through said outlet further includes forcing said molten repair material through said outlet by feeding said gas through said inlet into said chamber and creating a stream of said molten repair material.

24. The method according to claim 22, wherein the step of passing said molten repair material through said outlet comprises passing said molten repair material through a substantially circular outlet nozzle.

25. The method according to claim 22, wherein the step of passing said molten repair material through said outlet comprises passing said molten repair material through a rectangular nozzle.

26. The method according to claim 20 wherein said predetermined quench rate is greater than about $10^4$ degrees Kelvin per second.

27. A method for providing a rapidly solidified turbine repair material, said rapidly solidified turbine repair material containing a plurality of precipitates, wherein each of said plurality of precipitates has a size less than $10^{-6}$ m and said plurality of precipitates comprises a volume fraction of less than about 50 volume percent of said rapidly solidified repair material, said method comprising the steps of:
  a) providing a molten repair material; and
  b) contacting said molten repair material with a peripheral surface of a rotating drum, wherein said molten repair material is cooled at a rate of at least $10^4$ degrees Kelvin per second, thereby forming said rapidly solidified turbine repair material.

28. The method according to claim 27, wherein the step of contacting said molten repair material with said peripheral surface includes the steps of:
  a) contacting said molten repair material with at least one groove disposed on said peripheral surface, said groove having a length, width, and depth;
  b) cooling said molten repair material at a rate of at least $10^4$ degrees Kelvin per second; and
  c) obtaining said rapidly solidified turbine repair material, wherein said rapidly solidified turbine repair material has a length dimension, a width dimension, and a thickness corresponding to said length, said width, and said depth of said groove.

29. The method according to claim 27, wherein the step of contacting said molten repair material with said peripheral surface includes the steps of:
  a) contacting said molten repair material with a continuous groove disposed on said peripheral surface, said groove having a length, width, and depth;
  b) cooling said molten repair material at a rate of at least $10^4$ degrees Kelvin per second; and
  c) obtaining an elongated length of said rapidly solidified turbine repair material.

30. The method according to claim 27, wherein the step of contacting said molten repair material with said peripheral surface includes the steps of:
  a) contacting said molten repair material with at least one groove disposed on said peripheral surface, said groove having a plurality of protrusions that define at least one sub-groove having a length dimension;
  b) cooling said molten repair material at a rate of at least $10^4$ degrees Kelvin per second; and
  c) obtaining said rapidly solidified turbine repair material, wherein said rapidly solidified turbine repair material has a length dimension corresponding to said length of said sub-groove.

31. The method according to claim 27, wherein the step of contacting said molten repair material with said groove includes contacting a plurality of said sub-grooves.

32. The method according to claim 31, wherein the step of contacting a plurality of said sub-grooves includes the step of contacting said plurality of sub-grooves, wherein each of said plurality of sub-grooves has a different length.

33. The method according to claim 27, wherein the step of contacting said molten repair material with said peripheral surface further includes the steps of:
  a) contacting said molten repair material with at least one notch disposed on said peripheral surface, said notch having a length, a width, and a depth;
  b) cooling said molten repair material at a rate of at least $10^4$ degrees Kelvin per second; and
  c) obtaining said rapidly solidified turbine repair material, wherein said rapidly solidified turbine repair material has a length dimension, a width dimension, and a thickness corresponding to said length, said width, and said depth of said notch.

34. The method according to claim 33, wherein the step of contacting said molten repair material with said notch includes contacting a plurality of said notches.

35. The method according to claim 34, wherein the step of contacting a plurality of said notches includes the step of contacting said plurality of notches, wherein at least one of said notches has a size that is different from that of other said notches.

36. The method according to claim 27, further including the step of removing said rapidly solidified turbine repair material from said peripheral surface.

37. The method according to claim 36, wherein the step of removing said rapidly solidified turbine repair material from said peripheral surface includes contacting said peripheral surface of said rotating drum with a brush, whereby said brush removes said rapidly solidified turbine repair material from said peripheral surface.

38. The method according to claim 37, wherein the contacting said peripheral surface of said rotating drum with a brush comprises contacting a rotating brush, said rotating brush having a first direction of rotation, wherein said first direction of rotation is opposite a direction of rotation of said rotating drum.

39. The method according to claim 38, further including the step of collecting said rapidly solidified turbine repair material in a receptacle.

40. A method of repairing a turbine component comprising the steps of:
  a) providing a molten repair material;
  b) contacting said molten repair material with a peripheral surface of a rotating drum, wherein said molten repair material is cooled at a rate of at least $10^4$ degrees Kelvin per second, thereby forming said rapidly solidified turbine repair material;
  c) obtaining a rapidly solidified repair material, said repair material containing a plurality of precipitates, wherein each of said plurality of precipitates has a size less than $10^{-6}$ m and said plurality of precipitates comprise a volume fraction of less than about 50 volume percent of said rapidly solidified repair material;
  d) disposing said rapidly solidified repair material on a region of said turbine component wherein said region includes a defect to be repaired;
  e) melting said rapidly solidified repair material and a portion of said turbine component proximate to said defect; and f) resolidifying said rapidly solidified repair material and said portion, wherein said rapidly solidified repair material bonds to said portion, thereby removing said defect and repairing said component.

41. The method according to claim 40, wherein the step of providing a molten repair material further includes the steps of:
   a) providing a crucible, said crucible having a top wall, at least one side wall, and a floor having an outlet disposed therein, said top wall, said side wall and said floor defining an chamber therein, a heating means, an inlet disposed on one of said top wall and said side wall;
   b) providing a repair material to said chamber, said repair material having a melting temperature;
   c) feeding a gas through said inlet;
   d) heating said chamber and said repair material contained therein to a predetermined temperature, said predetermined temperature being greater than the melting temperature of said repair material, thereby forming said molten repair material; and
   e) passing said molten repair material through said outlet.

42. The method according to claim 41, wherein the step of passing said molten repair material through said outlet further includes forcing said molten repair material through said outlet by feeding said gas through said inlet into said chamber and creating a stream of said molten repair material.

43. The method according to claim 42, wherein the step of passing said molten repair material through said outlet comprises passing said molten repair material through a substantially circular outlet nozzle.

44. The method according to claim 43, wherein the step of contacting said molten repair material with said peripheral surface includes the steps of:
   a) contacting said molten repair material with at least one groove disposed on said peripheral surface, said groove having a length, width, and depth;
   b) cooling said molten repair material at a rate of at least $10^4$ degrees Kelvin per second; and
   c) obtaining said rapidly solidified repair material, wherein said rapidly solidified repair material has a length dimension, a width dimension, and a thickness corresponding to said length, said width, and said depth of said groove.

45. The method according to claim 43, wherein the step of contacting said molten repair material with said peripheral surface includes the steps of:
   a) contacting said molten repair material with a continuous groove disposed on said peripheral surface, said groove having a length, width, and depth;
   b) cooling said molten repair material at a rate of at least $10^4$ degrees Kelvin per second; and
   c) obtaining an elongated length of said rapidly solidified repair material.

46. The method according to claim 43, wherein the step of contacting said molten repair material with said peripheral surface includes the steps of:
   a) contacting said molten repair material with at least one groove disposed on said peripheral surface, said groove having a plurality of protrusions that define at least one sub-groove having a length dimension;
   b) cooling said molten repair material at a rate of at least $10^4$ degrees Kelvin per second; and
   c) obtaining said rapidly solidified repair material, wherein said rapidly solidified repair material has a length dimension corresponding to said length of said sub-groove.

47. The method according to claim 46, wherein the step of contacting said molten repair material with said groove includes contacting a plurality of said sub-grooves.

48. The method according to claim 47, wherein the step of contacting a plurality of said sub-grooves includes the step of contacting said plurality of sub-grooves, wherein each of said plurality of sub-grooves has a different length.

49. The method according to claim 41, wherein the step of passing said molten repair material through said outlet comprises passing said molten repair material through a rectangular nozzle.

50. The method according to claim 49, wherein the step of contacting said molten repair material with said peripheral surface further includes the steps of:
   a) contacting said molten repair material with at least one notch disposed on said peripheral surface, said notch having a length, a width, and a depth;
   b) cooling said molten repair material at a rate of at least $10^4$ degrees Kelvin per second; and
   c) obtaining said rapidly solidified repair material, wherein said rapidly solidified repair material has a length dimension, a width dimension, and a thickness corresponding to said length, said width, and said depth of said notch.

51. The method according to claim 50, wherein the step of contacting said molten repair material with said notch includes contacting a plurality of said notches.

52. The method according to claim 51, wherein the step of contacting a plurality of said notches includes the step of contacting said plurality of notches, wherein at least one of said notches has a size that is different from that of other said notches.

53. The method according to claim 40, further including the step of removing said rapidly solidified repair material from said peripheral surface.

54. The method according to claim 53, wherein the step of removing said rapidly solidified repair material from said peripheral surface includes contacting said peripheral surface of said rotating drum with a brush, whereby said brush removes said rapidly solidified repair material from said peripheral surface.

55. The method according to claim 54, wherein the contacting said peripheral surface of said rotating drum with a brush comprises contacting a rotating brush, said rotating brush having a first direction of rotation, wherein said first direction of rotation is opposite a direction of rotation of said rotating drum.

56. The method according to claim 53, further including the step of collecting said rapidly solidified repair material in a receptacle.

57. The method according to claim 40, wherein the step of providing a molten repair material further includes the steps of:
   a) providing a crucible, said crucible having at least one side wall, and a floor, said top wall, said side wall and said floor defining an chamber therein and an open top, and a heating means;
   b) providing a repair material to said chamber, said repair material having a melting temperature;
   c) heating said chamber and said repair material contained therein to a predetermined temperature, said predetermined temperature being greater than the melting temperature of said repair material, thereby forming said molten repair material.

58. The method according to claim 57, wherein the step of contacting said molten repair material with said peripheral surface further includes the steps of:

a) contacting said molten repair material with at least one notch disposed on said peripheral surface, said notch having a length, a width, and a depth;

b) cooling said molten repair material at a rate of at least $10^4$ degrees Kelvin per second; and c) obtaining said rapidly solidified repair material, wherein said rapidly solidified repair material has a length dimension, a width dimension, and a thickness corresponding to said length, said width, and said depth of said notch.

59. The method according to claim 58, wherein the step of contacting said molten repair material with said notch includes contacting a plurality of said notches.

60. The method according to claim 59, wherein the step of contacting a plurality of said notches includes the step of contacting said plurality of said notches, wherein at least one of said notches has a size that is different from that of other said notches.

\* \* \* \* \*